(12) United States Patent
deCler et al.

(10) Patent No.: US 6,382,593 B1
(45) Date of Patent: May 7, 2002

(54) FLUID COUPLING

(75) Inventors: Peter deCler, Stillwater; Patrick J. Ramacier, Jr., St. Paul; Brian J. Blenkush; Gary J. Harris, both of Maple Grove; Grant Armin Wilhelm, Plymouth, all of MN (US)

(73) Assignee: Colder Products Company, St. Paul, MN (US)

( * ) Notice: Subject to any disclaimer, the term of this patent is extended or adjusted under 35 U.S.C. 154(b) by 0 days.

(21) Appl. No.: 09/615,139

(22) Filed: Jul. 13, 2000

Related U.S. Application Data

(63) Continuation-in-part of application No. 09/519,501, filed on Mar. 6, 2000.

(51) Int. Cl.⁷ .............................. F16K 1/00; F16K 5/00
(52) U.S. Cl. ...................... 251/340; 251/345; 251/902; 137/881; 137/883; 137/887
(58) Field of Search .................................. 251/345, 340, 251/902; 137/887, 883, 881; 222/482

(56) References Cited

U.S. PATENT DOCUMENTS

| | | | |
|---|---|---|---|
| 184,573 A | * | 11/1876 | Becker |
| 1,006,244 A | * | 10/1911 | Low et al. |
| 1,037,378 A | * | 9/1912 | Ward |
| 4,037,623 A | * | 7/1977 | Beswick ...................... 137/599 |
| 4,286,636 A | | 9/1981 | Credle |
| 4,418,944 A | * | 12/1983 | Haines et al. .................. 285/24 |
| 4,436,125 A | | 3/1984 | Blenkush |
| 4,642,097 A | * | 2/1987 | Siposs ........................ 604/119 |
| 4,700,744 A | | 10/1987 | Rutter, et al. |
| 5,033,777 A | | 7/1991 | Blenkush |
| 5,178,303 A | | 1/1993 | Blenkush et al. |
| 5,316,041 A | | 5/1994 | Ramacier et al. |
| 5,494,074 A | | 2/1996 | Ramacier et al. |
| 5,845,943 A | | 12/1998 | Ramacier et al. |
| 5,911,403 A | | 6/1999 | DeCler et al. |
| 5,954,240 A | | 9/1999 | Duchon, et al. |
| 5,975,489 A | | 11/1999 | DeCler et al. |
| 6,024,124 A | | 2/2000 | Braun et al. |
| 6,082,401 A | | 7/2000 | Braun et al. |

FOREIGN PATENT DOCUMENTS

| | | |
|---|---|---|
| DE | 3841353 | 9/1989 |
| EP | 0352243 | 1/1990 |
| GB | 2134087 | 8/1984 |
| WO | 90/15951 | 12/1990 |

* cited by examiner

*Primary Examiner*—Philippe Derakshani
*Assistant Examiner*—D. Austin Bonderer
(74) *Attorney, Agent, or Firm*—Merchant & Gould P.C.

(57) ABSTRACT

A fluid coupling for dispensing fluids, suitable for connecting a fitment disposed within a fluid source to a fluid receiving member. The fluid coupling includes a housing that defines a central passage between front and back openings and a first flow passage between the back and a side openings. A lever actuator is rotatably mounted on the housing to open/close the first flow passage. A poppet member is disposed within the central passage to define a second flow passage. The poppet member is actuatable between an extended configuration and a retracted configuration to close/open the second flow passage. The housing, the poppet member and the lever actuator are each one-piece integrally molded device.

13 Claims, 9 Drawing Sheets

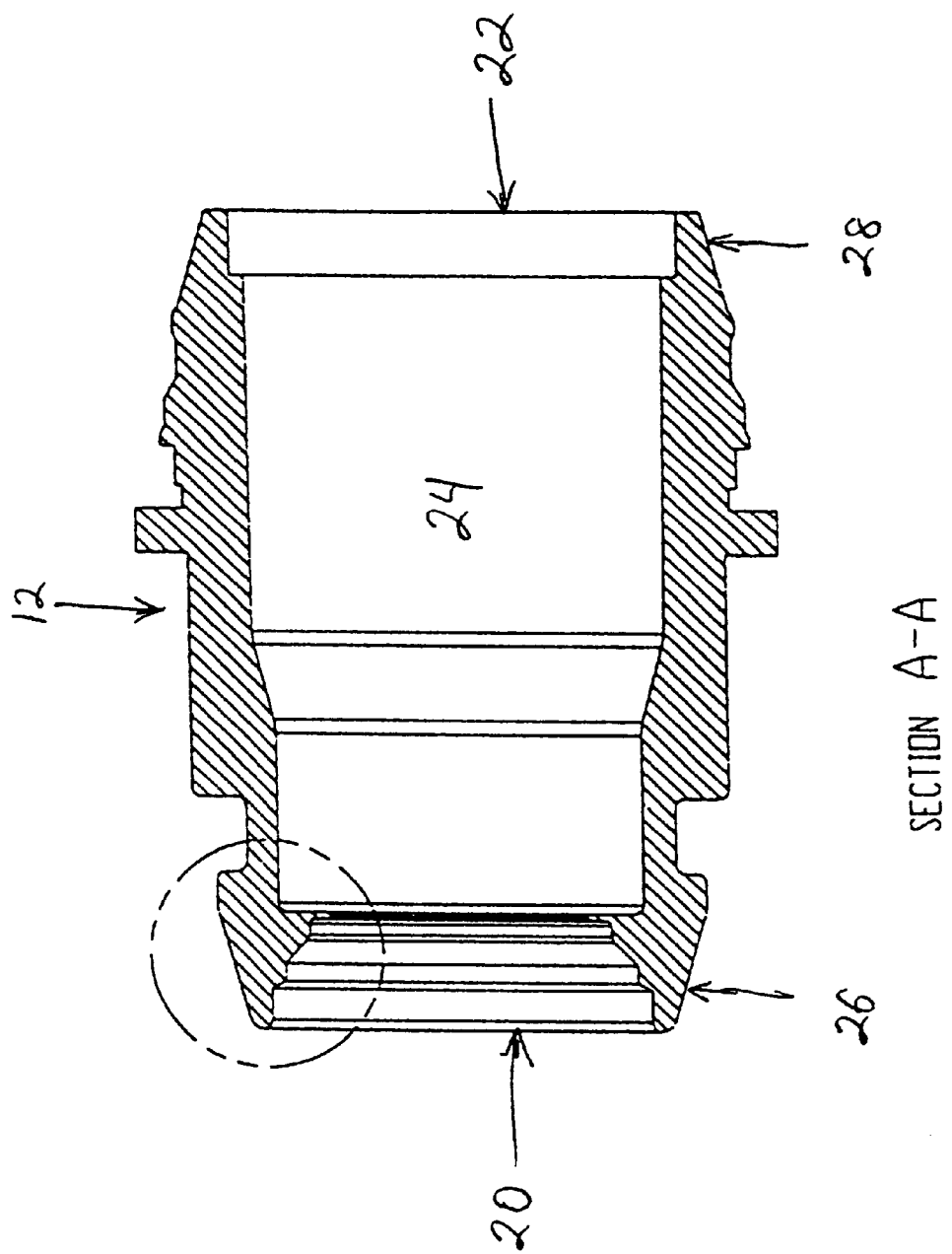

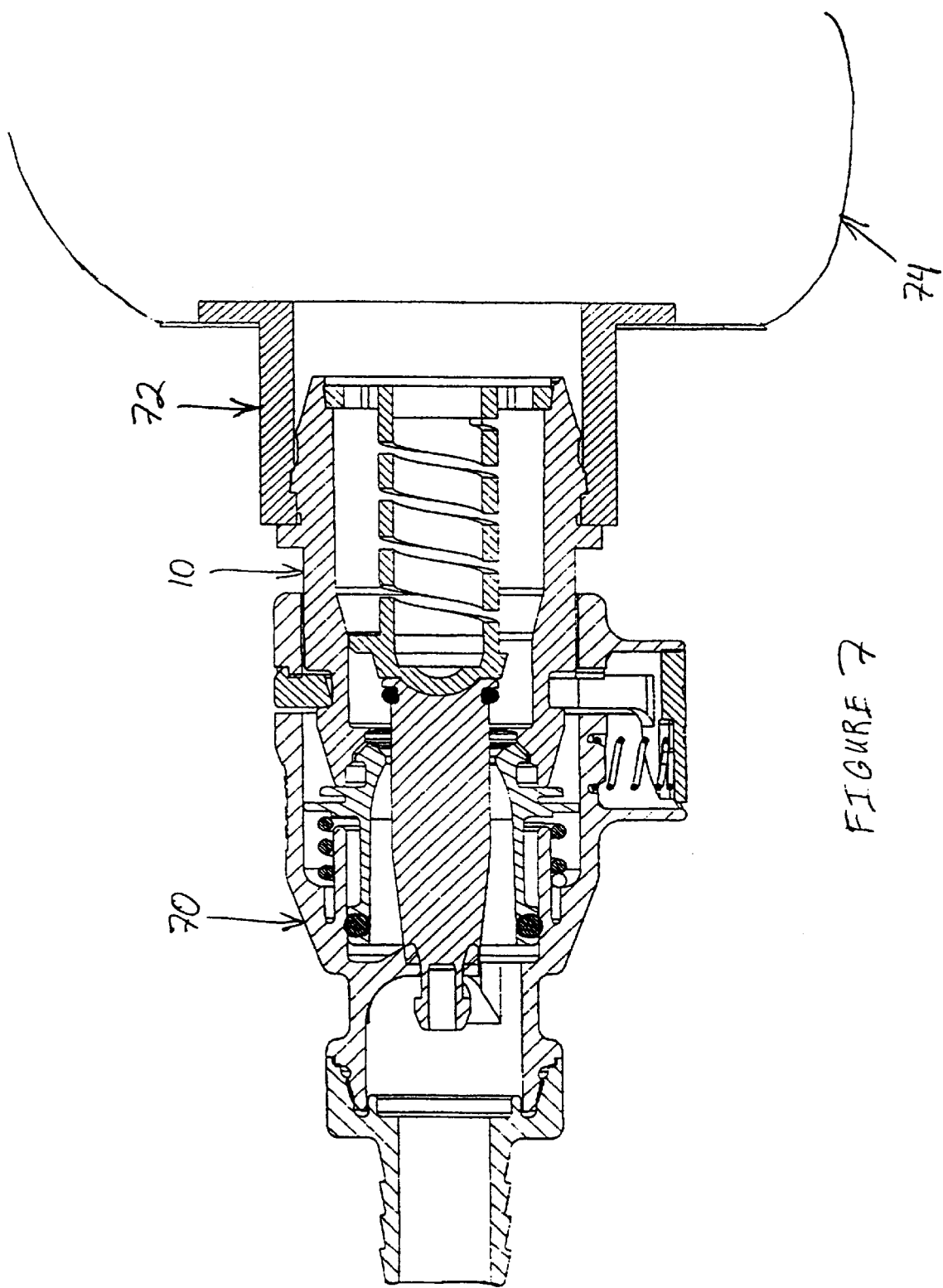

FLUID COUPLING

REFERENCE TO RELATED APPLICATIONS

This application is a continuation-in-part of assignee's pending application U.S. Ser. No. 09/519,501, filed on Mar. 6, 2000, and entitled "FLUID COUPLING."

FIELD OF THE INVENTION

The present invention relates generally to coupling structures for dispensing fluids. More particularly, the present invention relates to coupling for fluidly connecting a fluid source to a fluid dispensing device.

BACKGROUND OF THE INVENTION

Disposable containers are routinely used in commercial and industrial applications to transport and dispense a variety of fluids such as food products, cleaning solutions, detergents, and other products. Some containers are constructed of semi-rigid plastic while others are constructed of flexible plastic and are often supported within a protective box.

It is common for such structures to be equipped with fitment structures that facilitate connection with dispensing systems. Typically, a fluid coupling is then used to connect the fitment to a valve or similar system for controlled dispensing of the fluid.

Known fluid couplings typically include an outer housing with a flow path there through, and a poppet member telescopically mounted within the flow path. Known fluid couplings are commonly actuatable between an open and a closed configuration, wherein in the open configuration the coupling will pass fluid, and in the closed configuration, it will not. In addition to the housing and poppet, known fluid couplings also typically include numerous other components. For example, separate springs are widely used to bias the couplings in the closed configuration. Likewise, separate gaskets are commonly used to provide a more fluid-tight seal when the couplings are in the closed configuration. In addition, separate retaining means are often used to secure the poppet within the housing. Typically, the various parts are made of different materials, such as metal for the springs, plastic for the poppet, rubber for the gasket, and so forth. Consequently, a conventional fluid coupling typically has many parts, each of which must be made separately, each of which is commonly made of a different material, and all of which must be assembled to produce a functional device.

One example of such a coupling is shown in U.S. Pat. No. 5,975,489, currently assigned to the applicant. Another example of such a coupling is shown in U.S. Pat. No. 5,911,403, also currently assigned to the applicant.

Cost and simplicity of manufacture are important factors to be considered in designing fluid couplings. A coupling with many separately manufactured parts is difficult to produce and assemble economically.

Also, many fluids used with fluid couplings are prone to drying, congealing, or otherwise depositing material. The likelihood of malfunction due to fouling tends to increase with the number of parts, reducing the reliability of a coupling with many parts.

Furthermore, not all materials are suitable for use with all fluids. Certain metals are prone to corrosion, many plastics are unstable in the presence of solvents, and so forth. A coupling with many parts made of many materials is thus more likely to degrade in the presence of a particular fluid than a coupling with few parts.

In addition, known fluid couplings typically have flow paths that pass through the spring used to bias the coupling in the closed configuration. However, viscous fluids do not pass easily through a tightly coiled spring, with the result that their flow rate through the coupling is low. In addition, the coils of a spring are particularly prone to fouling from fluids prone to drying, congealing, or otherwise depositing material, with the result that the flow rate decreases or stops over time.

The present invention provides a fluid coupling, which is inexpensive to manufacture and has improved operating characteristics.

SUMMARY OF THE INVENTION

The present invention relates to fluid coupling for fluidly connecting a fluid source to a fluid dispensing device. The fluid coupling is suitable for mechanically and fluidly connecting a fitment disposed within a fluid source with a fluid receiving member.

The coupling includes a housing with front and back openings and a central passage there through, with a poppet member disposed within the central passage. The coupling is actuatable between an open configuration, whereby fluid flow through the coupling is enabled, and a closed configuration, whereby fluid flow through the coupling is not enabled. The housing is a one-piece, integrally formed device. The poppet is likewise a one-piece, integrally formed device. The one-piece, integral construction of the components and the small number of components permit efficient manufacture and assembly, resulting in low cost, so that the fluid coupling may be economically used as a disposable device.

The body portion of the poppet member defines a flow path between itself and the housing. When the fluid coupling is in the open configuration, fluid therefore flows around the body portion of the poppet, generally unobstructed by the poppet.

In yet another embodiment of the present invention, the coupling includes a housing that defines a central passage between front and back openings and a first flow passage between a side and the back openings. A poppet is disposed within the central passage to define a second flow passage. A lever actuator is rotatably mounted on the housing. The lever actuator rotates between a first position in which the first flow passage is open and a second position in which the first flow passage is closed. The poppet is actuatable between an extended configuration in which the second flow passage is closed and a retracted configuration in which the second flow passage is open. The housing further includes at least one stop member to limit the movement of the lever actuator between the first and second positions. The poppet has at least one retention member at the base portion that matches a retention surface inside the housing downstream of the side opening to retain the poppet therein.

A variety of additional advantages of the invention will be set forth in part in the description which follows, and in part will be obvious from the description, or may be learned by practice of the invention. The advantages of the inventions will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

Like reference numbers generally indicate corresponding elements in the figures.

FIG. 3 is a longitudinal cross-section of the housing of the fluid coupling shown in FIG. 1.

FIG. 7 is a longitudinal cross-section of an embodiment of a fluid dispensing system utilizing the fluid coupling of FIG. 1.

DETAILED DESCRIPTION OF THE INVENTION

Figure 2:
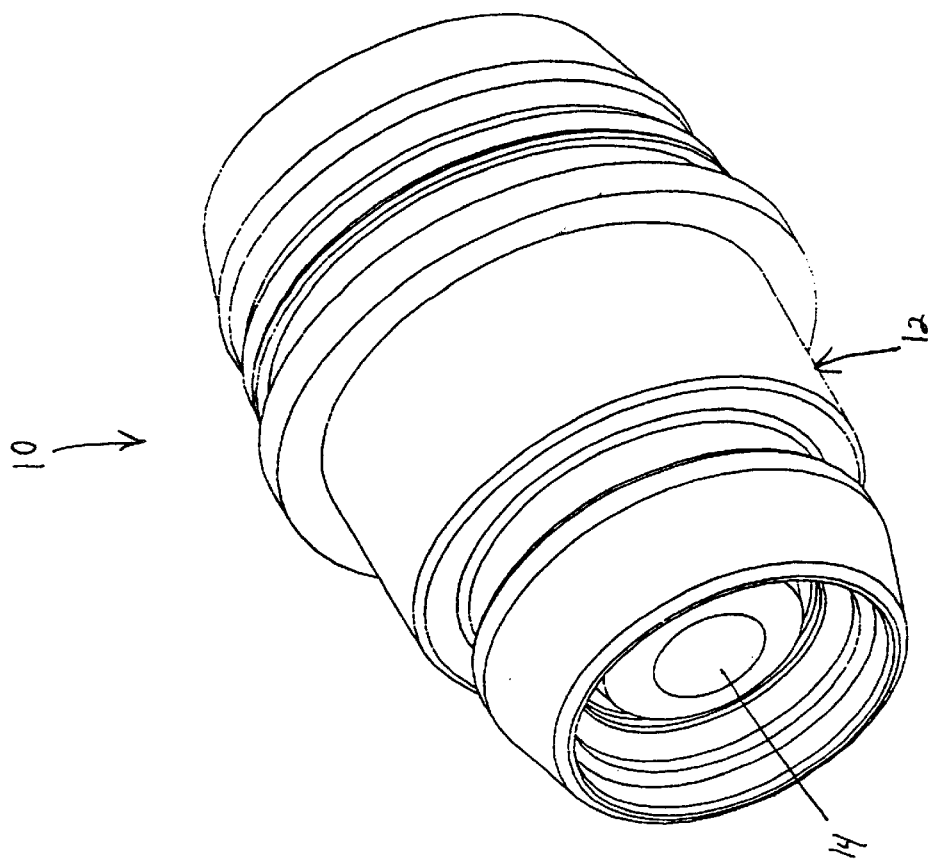
FIG. 2 is a front perspective of the fluid coupling shown in FIG. 1.
Figure 1:
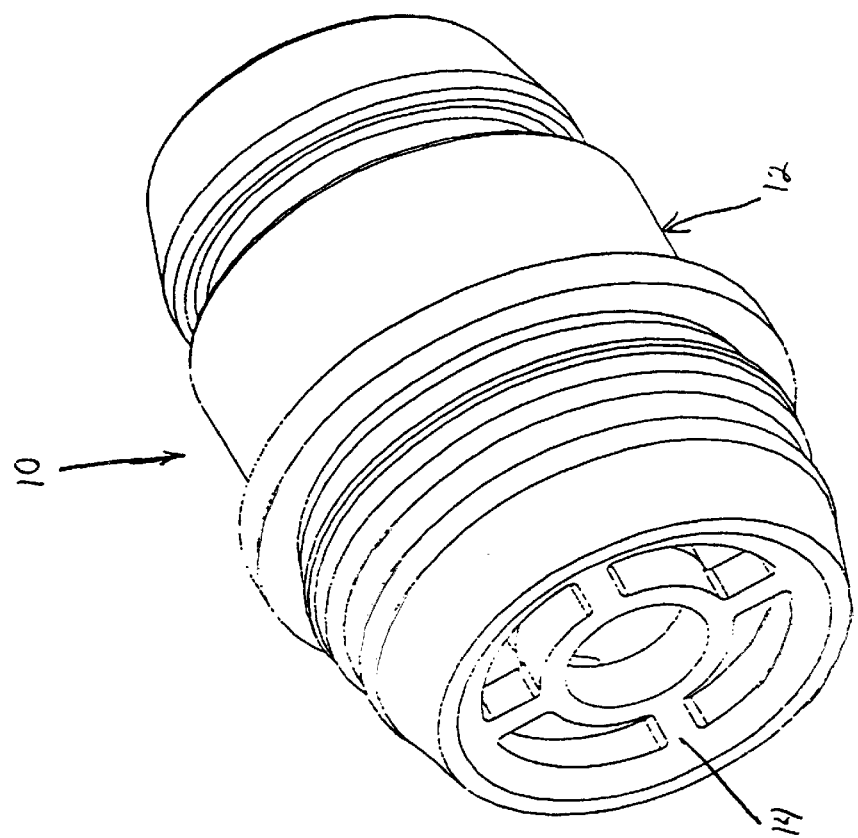
FIG. 1 is a back perspective of a preferred embodiment of a fluid coupling in accordance with the principles of the present invention.

FIGS. 1 and 2 illustrate an embodiment of a fluid coupling in accordance with the principles of the present invention, the fluid coupling generally being referenced by the reference number 10. The fluid coupling 10 includes a housing 12, with a poppet member 14 disposed therein.

Turning now to FIG. 3, it may be seen that the housing 12 defines front opening 20 and back opening 22 and a central passage 24 running through the housing. The housing 12 also has front end 26 and back end 28. As is visible, the housing 12 is a one-piece, integrally formed structure.

As may be seen in FIG. 7, the front end 26 of housing 12 is suitable for connection with a fluid receiving member 70. Likewise, the back end 28 of housing 12 is suitable for connection to a fitment 72 disposed in a fluid source 74. As so assembled, the fluid coupling 10 therefore enables fluid flow from the fluid source 74 through the fluid coupling and thence to the fluid receiving member 70. It is envisioned that the fluid source 74 is a bag, bottle or drum holding a variety of fluids, including but not limited to foods, beverages, inks, medicines, solvents, etc. However, it will be apparent to those knowledgeable in the art that other fluid sources may be equally suitable, and likewise that the present invention may be suitable for use with other fluids. In addition, it is often preferable that the fluid coupling 10 be made of plastic, which is typically light in weight and generally resistant to many common fluids. Furthermore, in many conventional applications, the fluid source 74 and/or the fitment 72 are preferably disposable, and thus it is also preferable that the fluid coupling 10 is also disposable.

One particular application for the fluid coupling 10 is for dispensing of ketchup. In such an application, it is envisioned that the fluid coupling 10 would be connected to a disposable fitment 72 disposed within a disposable plastic bag of ketchup serving as a fluid source 74, and that the fluid coupling 10 would further be connected to a female coupling member 70. Thereby, ketchup could be conveniently and hygienically dispensed from the plastic bag for any suitable purpose, with the bag, fitment 72 and fluid coupling 10 being economically discarded after use. It will be apparent to those knowledgeable in the art that this application is exemplary only, and that the fluid coupling 10 may be equally suitable for other applications.

Fluid sources, fitments, and fluid receiving members are well known, and are not further detailed herein.

Figure 4:
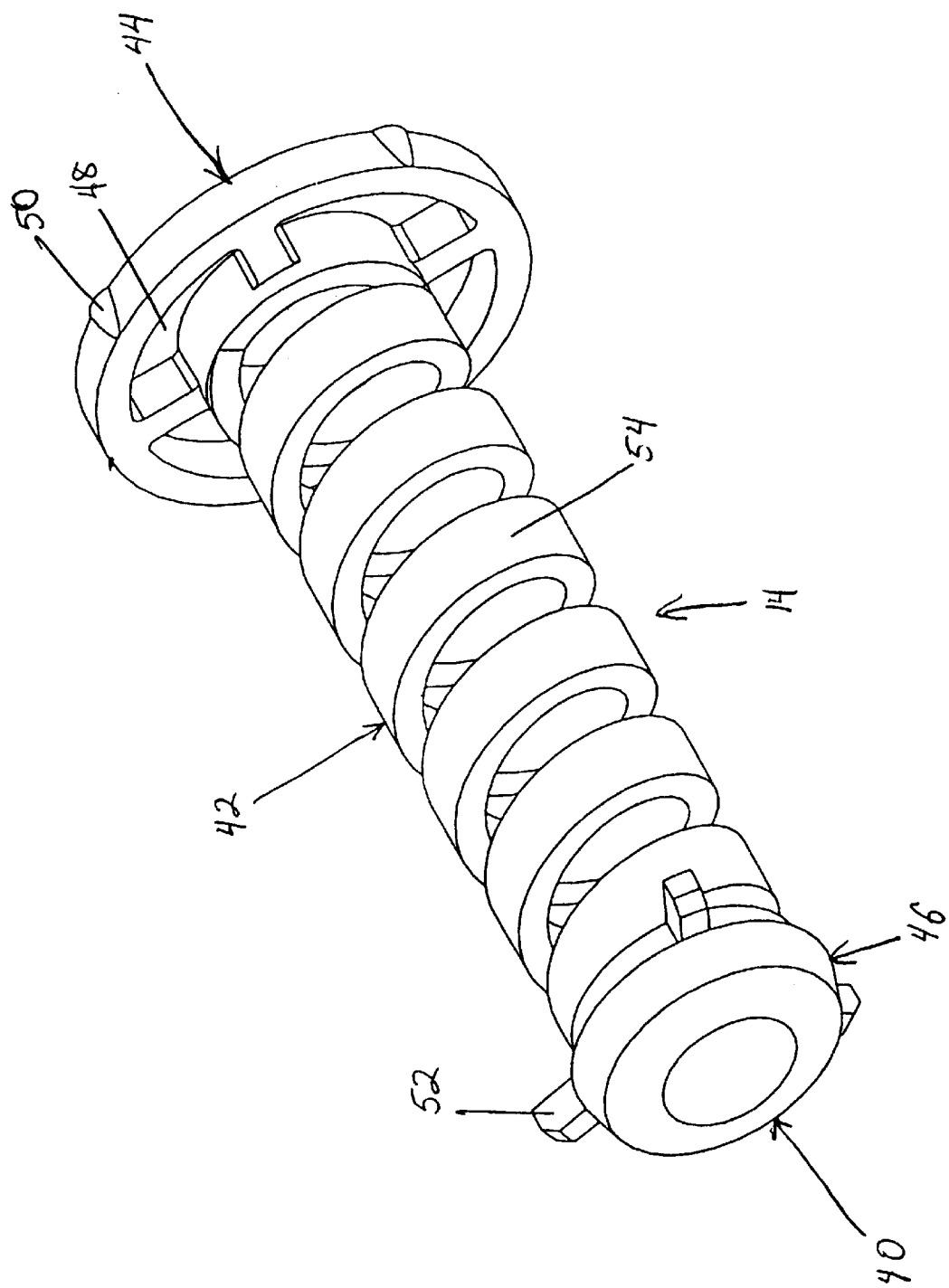
FIG. 4 is a front perspective of the poppet member of the fluid coupling shown in FIG. 1.

FIG. 4 shows poppet member 14, with head portion 40, body portion 42, and base portion 44. As is visible, the poppet member is a one-piece, integrally formed structure.

Figure 6:
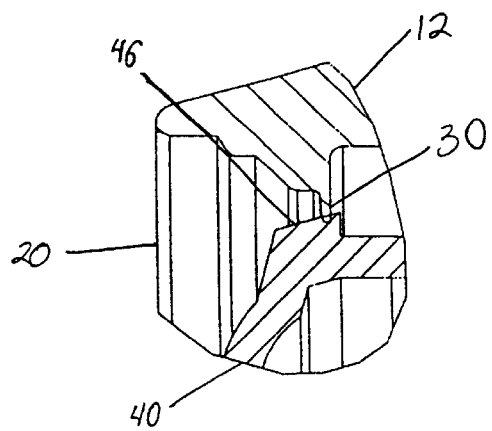
FIG. 6 is a partial, enlarged cross-section of a portion of the fluid coupling shown in FIG. 1 in the closed configuration.
Figure 5:
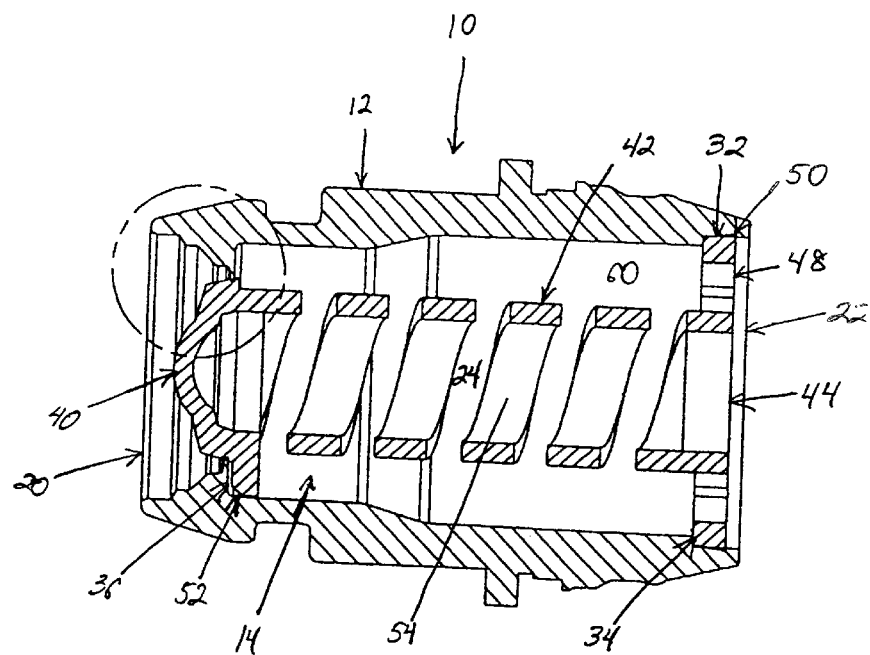
FIG. 5 is a longitudinal cross-section of the fluid coupling shown in FIG. 1.

In FIG. 5, it may be seen that the poppet member 14 is disposed within the central passage 24 of housing 12. The fluid coupling 10 is actuatable between an open configuration, as shown in FIG. 5, and a closed configuration, as shown in FIG. 6. In the open configuration, fluid flow through the fluid coupling is enabled. In the closed configuration, fluid flow through the fluid coupling is not enabled.

As is illustrated most clearly in FIG. 6, in the preferred embodiment of the invention the head portion 40 of the poppet member 14 has a sealing surface 46. The housing 12 likewise has a sealing member 30 proximate the front opening 20. When the fluid coupling 10 is in the closed configuration, the sealing surface 46 and the sealing member 30 cooperate to form a fluid-tight seal. As envisioned, the sealing surface 46 is an annular sloping surface circumferential to the head portion 40 of the poppet member 14, and the sealing member 30 is a flexible, annular, radial inwardly extending member. However, it will be apparent to those knowledgeable in the art that this configuration is exemplary only, and that other configurations may be equally suitable.

As may be seen in FIG. 5, in the preferred embodiment the body portion 42 of the poppet member 10 is sized so as to define a flow passage 60 within the central passage 24 of housing 12. When the fluid coupling 10 is in the open configuration, fluid flow is enabled through the flow passage 60. As is visible, no springs or similar obstacles obstruct the flow passage. As envisioned, the flow passage 60 is annular, and is coaxial with the body portion 42 of the poppet member 14. However, it will be apparent to those knowledgeable in the art that other configurations, including but not limited to a flow passage 60 that is partly or entirely contained within the body portion 42 of the poppet member 14, may be equally suitable.

Additionally, in the preferred embodiment the base portion 44 of poppet member 14 defines at least one flow opening 48. The flow opening 48 is in fluid communication with the flow passage 60. In the preferred embodiment shown, the base portion 44 of the poppet member 14 is generally discoidal, and defines four flow openings 48 disposed radially outward from the body portion 42 of the poppet member 14. However, it will be apparent to those knowledgeable in the art that this configuration is exemplary only, and that other configurations may be equally suitable.

Also, in the preferred embodiment the base portion 44 of the poppet member 14 has at least one retention member 50. Likewise, the housing 12 has a retention surface 32 proximate the back opening 22. The retention member 50 cooperates with the retention surface 32 to retain the poppet member 14 within the housing 12. As envisioned, the retention member 50 is a radial outwardly extending stud, and the retention surface 32 is an annular surface, which form an interference fit to retain the poppet member 14 within the housing 12. In the preferred embodiment shown, there are four retention members 50 distributed approximately 90 degrees apart about the periphery of the base portion 44 of the poppet member 14. However, it will be apparent to those knowledgeable in the art that this configuration is exemplary only, and that other configurations may be equally suitable. Furthermore, it will be apparent to those knowledgeable in the art that the use of an interference fit is exemplary only, and that other retaining methods including but not limited to a snap fit may be equally suitable.

Furthermore, in the preferred embodiment the housing 12 has a first obstruction surface 34 proximate the back opening 22. The first obstruction surface 34 obstructs the passage of the base portion 44 of the poppet member 14 through the back opening 22 of the housing 12, thereby limiting the degree of penetration of the poppet member 14 into the central passage 24 of the housing 12. It is envisioned that the first obstruction surface 34 is a first radial inwardly extending flange, which will obstruct the base portion 44 of the poppet member 14. However, it will be apparent to those knowledgeable in the art that this configuration is exemplary only, and that other configurations may be equally suitable.

It is envisioned that the preferred embodiment of the fluid coupling 10 be assembled by inserting the head portion 40 of the poppet member 14 into the back opening 22 of the housing 12, until the base portion 44 is obstructed by the first obstruction surface 34, and that the retention member 50 will then cooperate with the retention surface 32 to retain the poppet member within the housing. However, it will be apparent that the method of assembly is dependent upon the exemplary configuration of the fluid coupling 10 herein described, and that other methods of assembly may be equally suitable Moreover, in the preferred embodiment the housing 12 has a second obstruction surface 36 proximate the front opening 20. Likewise, the head portion 40 of the poppet member 14 has at least one obstruction member 52. The second obstruction surface 36 cooperates with the obstruction member 52 to obstruct the passage of the head portion 40 of the poppet member 14 through the front opening 20 in the housing 12. It is envisioned that the second obstruction surface 36 is a second radial inwardly extending flange, and that the obstruction member 52 is a radial outwardly extending barb. In the preferred embodiment shown, there are three obstruction members 44 distributed approximately 120 degrees apart about the periphery of the head portion 40 of the poppet member 14. However, it will be apparent to those knowledgeable in the art that this configuration is exemplary only, and that other configurations may be equally suitable.

Additionally, in the preferred embodiment the poppet member 14 is telescopically actuatable between an extended and a retracted configuration. Thereby, when the poppet member 14 is in the extended configuration, the sealing surface 46 of the head portion 40 cooperates with the sealing member 30 of the housing 12 to form a fluid tight seal, whereby the fluid coupling 10 is in the closed configuration. Contrariwise, when the poppet member 14 is in the retracted configuration, the flow passage 60 is in fluid communication with the front opening 20 of the housing 12, whereby the fluid coupling 10 is in the open configuration.

Also, in the preferred embodiment the poppet member 14 includes at least one biasing member 54 for biasing the fluid coupling 10 in the closed configuration. It is envisioned that the biasing member 54 is a helical compression spring located in the body portion 42 of the poppet member 14. However, it will be apparent to those knowledgeable in the art that this configuration is exemplary only, and that other configurations may be equally suitable.

Furthermore, in the preferred embodiment the fluid coupling 10 is made of moldable material, so as to enable easy and economical manufacture. It is envisioned that the fluid coupling 10 will be made of a lightweight, resilient, and generally fluid-resistant material, such as plastic, and in particular a thermoplastic such as low-density polyethylene or acetal. However, it will be apparent to those knowledgeable in the art these materials are exemplary only, and that other moldable materials, including but not limited to epoxy, silicone, and polypropylene may be equally suitable.

Figure 8:
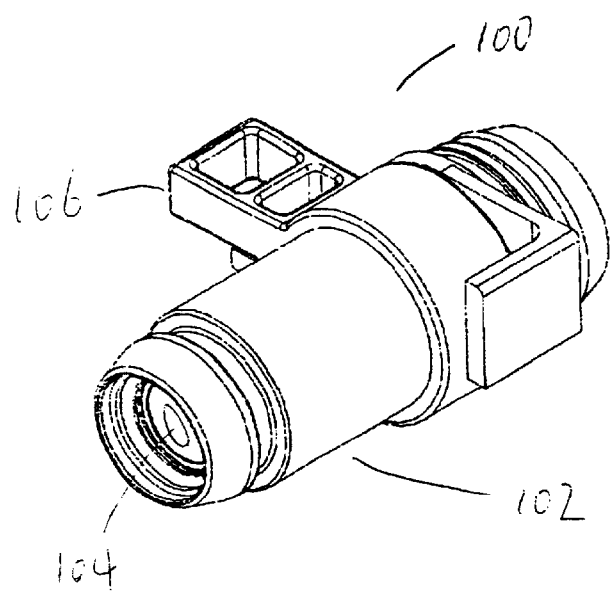
FIG. 8 is a perspective view of a fluid coupling in an open position according to another embodiment of the present invention.
Figure 9:
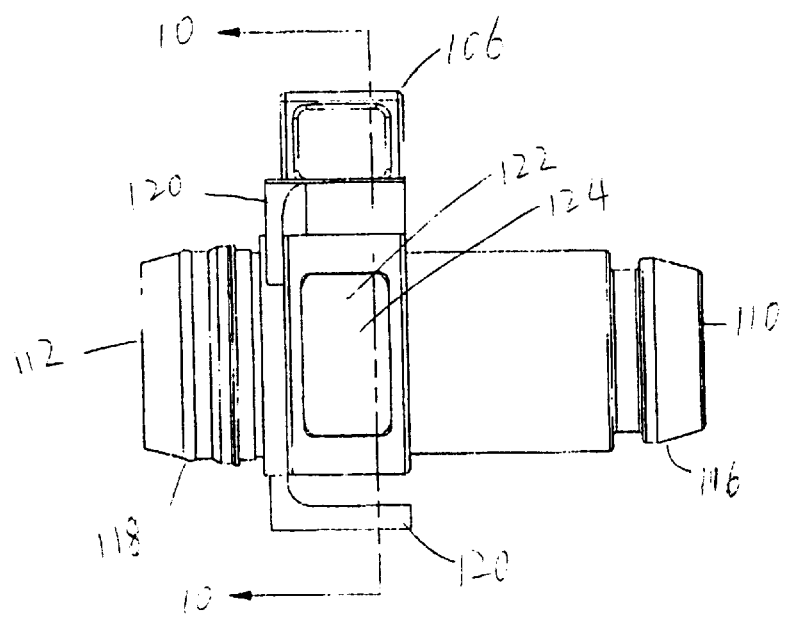
FIG. 9 is a front view of the fluid coupling in the open position according to another embodiment of the present invention.
Figure 10:
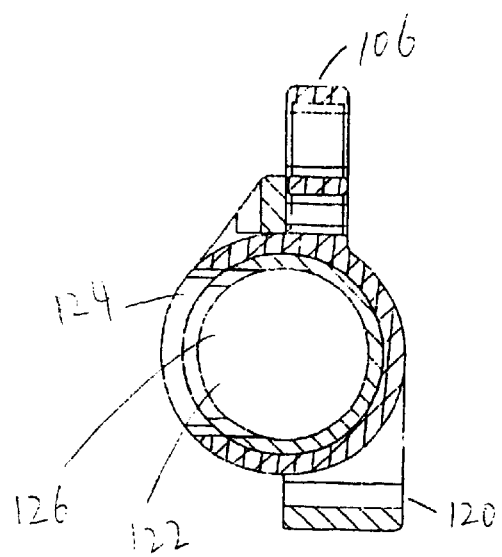
FIG. 10 is a cross-sectional view of the fluid coupling along line 10—10 of FIG. 9 according to another embodiment of the present invention.
Figure 11:
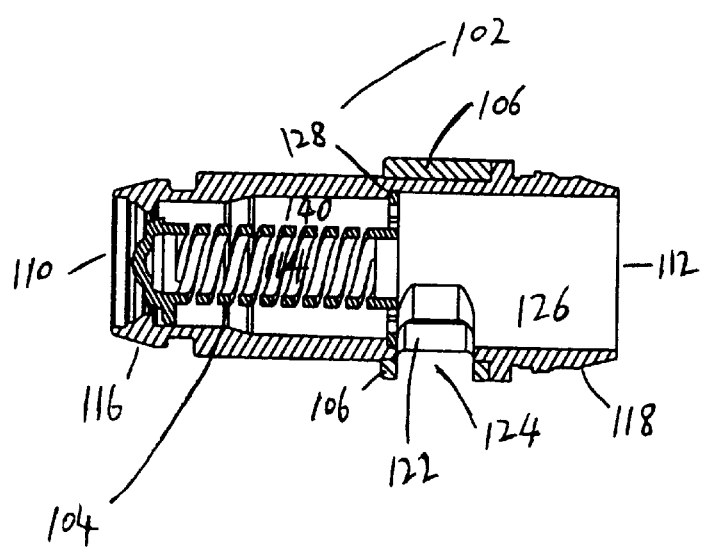
FIG. 11 is a longitudinal cross-sectional view of the fluid coupling in the open position in according to another embodiment of the present invention.
Figure 12:
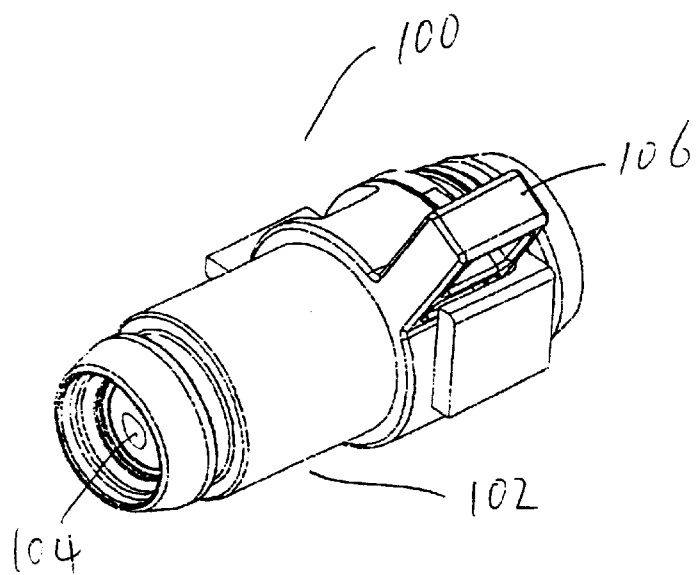
FIG. 12 is a perspective view of the fluid coupling in a closed position according to another embodiment of the present invention.
Figure 13:
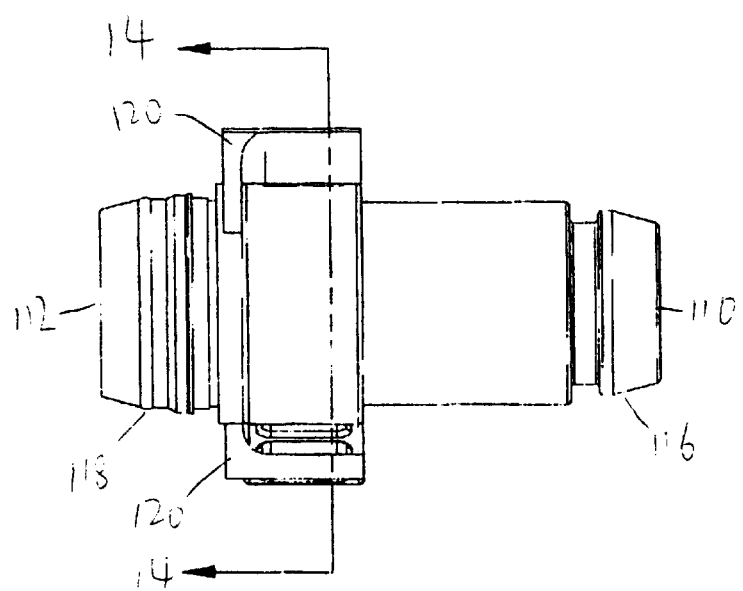
FIG. 13 is a front view of the fluid coupling in the closed position according to another embodiment of the present invention.

FIGS. 8–15 illustrate another embodiment of a fluid coupling in accordance with the principles of the present invention. As shown in FIGS. 8 and 12, the fluid coupling 100 includes a housing 102, a poppet member 104 disposed therein, and a lever actuator 106 rotatably mounted outside the housing 102.

Figure 14:
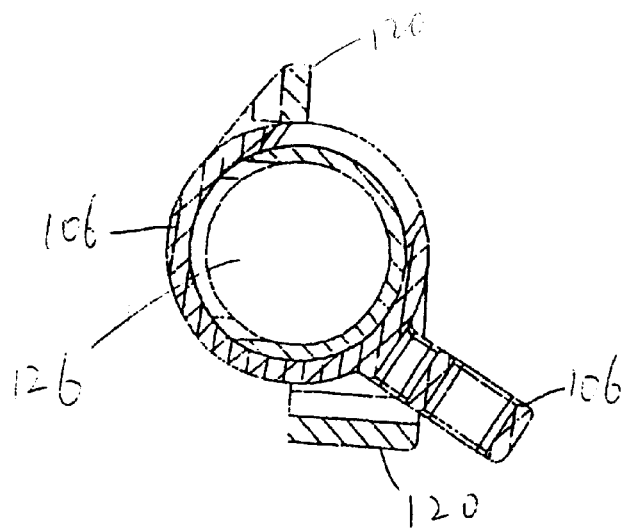
FIG. 14 is a cross-sectional view of the fluid coupling along line 14—14 of FIG. 13 according to another embodiment of the present invention.
Figure 15:
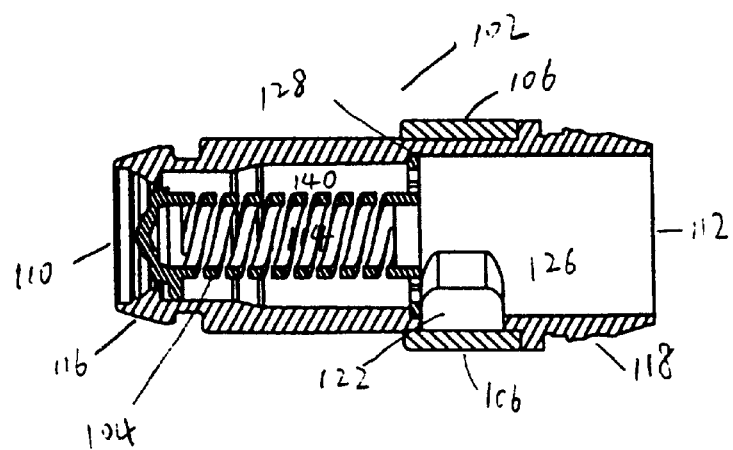
FIG. 15 is a longitudinal cross-sectional view of the fluid coupling in the closed position in according to another embodiment of the present invention.

As discussed in the previous embodiment, it may be seen from FIGS. 14 and 15 that the housing 102 in this embodiment also has a front opening 110 and a back opening 112 with a central passage 114 there through. The poppet member 104 is disposed within the central passage 114 that defines a flow passage 140. The poppet member 104 is biased into a normally closed position forming a fluid tight seal with the front end 116. The front end 116 of the housing 102 is suitable for connecting to a fluid receiving member, e.g., the fluid receiving member 70 as shown in FIG. 7; and the back end 118 is suitable for connecting to a fluid source such as the fluid source 74 shown in FIG. 7. The fluid coupling 100 is actuatable between an open configuration in which the poppet member 104 is retracted to open the flow passage 140, and a closed configuration in which the poppet member 104 is extended to close the flow passage 140. As the structures of the housing with the central passage and the poppet member (shown in FIG. 4) disposed therein are the same as previous embodiment, no detailed description will be provided herein.

The differences between the present embodiment and the previous embodiment will be detailed hereafter with FIGS. 8–15. In addition to the features of the previous embodiment, the housing 102 further has a side opening 122, which is in cooperated with the back opening 112 to define another flow passage 126 besides the flow passage 140. A lever actuator 106 is rotatably mounted on the housing 102, and rotatable between a first position to open the flow passage 126 and a second position to close the flow passage 126.

When pulling the fluid coupling 100 to a position as shown in FIGS. 8–11, the flow passage 126 is open. At this position, the opening 124 of the lever actuator 106 is aligned with the opening 122 of the housing 102 to allow fluid dispensing from the fluid source. When the fluid coupling 100 is turned to the position as shown in FIGS. 12–15, the flow passage 126 is closed. At this position, the lever actuator 106 shuts the opening 122 to prevent fluid from dispensing, and the fluid is trapped within the housing 102.

In addition, the housing 102 of this embodiment has at least one stop member 120 to limit the movement of the lever actuator 106 between the first position to open the flow passage 126 and the second position to shut the flow passage 126.

Furthermore, it may be seen that the poppet member 104 is disposed within the housing 102 in a position as shown in FIGS. 11 and 15. The base portion of the poppet member 104 has at least one retention member to match a retention surface 128 downstream of the side opening 122 of the housing 102 to retain the poppet member 104 therein.

When the fluid coupling 100 is in use, for example, for dispensing ketchup, two flow passages 126 and 140 are provided to allow dispensing ketchup from fluid source. Ketchup can be dispensed through the flow passage 126 defined by the side and back openings (122 and 112) of the housing 102, by pulling the lever actuator 106 to the open position as shown in FIG. 8; or through the flow passage 140 defined by the front and back openings (110 and 112) of the housing 102 when the fluid coupling 100 is further connected to a fluid receiving member, by actuating the fluid coupling 100 via retracting the poppet member 104. It is to be understood that the fluid coupling 100 can be used for but not limited to foods, beverages, inks, medicines, detergents, etc. The fluid coupling 100 has high volume in dispensing, and low cost in manufacturing, and thus can be economically disposed after use.

In this embodiment, the housing 102, the poppet member 104, and the lever actuator 106 are each a one-piece, integrally molded structure, and are made of plastic, such as low-density polyethylene or acetal. However, it is appreciated that the housing 102, the poppet member 104 and the lever actuator 106 can also be made of other lightweight, fluid-resistant materials.

It is to be understood that while certain embodiments of the present invention have been illustrated and described, the invention is not limited to the specific forms or arrangements of the parts described and shown, and that the specification and depicted embodiment is to be considered exemplary only, with the true scope and spirit of the invention being indicated by the broad meaning of the following claims.

We claim:

1. A fluid coupling, comprising:
   a housing having a front end with a front opening, a back end with a back opening, and a side opening, the housing defining a first flow passage extending between the back opening and the side opening, the housing defining a central passage extending longitudinally between the front opening and the back opening;
   a lever actuator rotatably mounted on the housing having an opening corresponding to the side opening of the housing, and rotatable between a first position in which the first flow passage is open and a second position in which the first flow passage is closed; and
   a poppet member disposed within the central passage; the poppet member cooperating with the housing to define a second flow passage; the poppet member is actuatable between an extended configuration in which the second flow passage is closed and a retracted configuration in which the second flow passage is open;
   wherein the poppet member is retained within the housing in a position downstream of the side opening.

2. The fluid coupling according to claim 1, wherein the housing further includes at least one stop member to limit the movement of lever actuator between the first position and the second position.

3. The fluid coupling according to claim 2, wherein the housing, the lever actuator and the poppet member are each a one-piece, integrally molded structure.

4. The fluid coupling according to claim 1, wherein the front end of the housing is suitable or connecting a fluid receiving member, and the back end of the housing is suitable for connecting a fitment disposed within a fluid source.

5. The fluid coupling according to claim 1, wherein the poppet member has a head portion, a body portion and a base portion, the head portion having a sealing surface that matches a sealing member proximate the front opening of the housing to form a fluid-tight seal when the poppet member is extended, the body portion defining the second flow passage, and the base portion defining at least one flow opening radially outward from the body portion which is in fluid communication with the second flow passage.

6. The fluid coupling according to claim 5, wherein the base portion of the poppet member has at least one retention member, and the housing has a retention surface downstream of the side opening of the housing, the at least one retention member and the retention surface cooperating to retain the poppet member therein.

7. The fluid coupling according to claim 1, wherein the poppet member is telescopically actuatable between an extended configuration and a retracted configuration, the fluid coupling being in the closed configuration when the poppet member is in the extended configuration, and the fluid coupling being in the open configuration when the poppet member is in the retracted configuration.

8. The fluid coupling according to claim 1, wherein the poppet member comprises at least one elastic member for biasing the fluid coupling in the closed configuration.

9. The fluid coupling according to claim 1, wherein the housing, the poppet member and the lever actuator are made of plastic.

10. The fluid coupling according to claim 1, wherein the housing, the poppet member and the lever actuator are made of a material selected from the group consisting of acetal and low-density polyethylene.

11. The fluid coupling according to claim 1, wherein the first flow passage and the second flow passage each being separately actuatable between open and closed positions.

12. A fluid coupling, comprising:
    a one-piece, integrally molded housing having a front end with a front opening, a back end with a back opening, and a side opening, the housing defining a first flow passage extending between the back opening and the side opening, the housing defining a central passage extending longitudinally between the front opening and the back opening;
    a lever actuator rotatably mounted on the housing having an opening corresponding to the side opening of the housing, and rotatable between a first position in which the first flow passage is open and a second position in which the first flow passage is closed; and
    a poppet member disposed within the central passage; the poppet member having a head portion, a body portion and a base portion, the head portion having a sealing surface that matches a sealing member proximate the front opening of the housing to form a fluid-tight seal when the poppet member is extended, the body portion defining a second flow passage, the base portion defining at least one flow opening radially outward from the body portion which is in fluid communication with the second flow passage; the poppet member is actuatable between an extended configuration in which the second flow passage is closed and a retracted configuration in which the second flow passage is open;

wherein the base portion of the poppet member has at least one retention member to match a retention surface downstream of the side opening of the housing to retain the poppet member therein;

wherein the housing further includes at least one stop member to limit the movement of the lever actuator between the first position and the second position.

13. The fluid coupling according to claim 12, wherein the first flow passage and the second flow passage each being separately actuatable between open and closed positions.

* * * * *